Patented June 14, 1949

2,472,946

UNITED STATES PATENT OFFICE 2,472,946

PRODUCTION OF TRICHLOROACETYL CHLORIDE

Edwin J. Hart, Cedar Grove, and Max S. Matheson, Clifton, N. J., assignors to United States Rubber Company, New York, N. Y., a corporation of New Jersey No Drawing. Application September 27, 1947, Serial No. 776,614

5 Claims. (Cl. 260—544)

This invention relates to the production of trichloroacetyl chloride from tetrachloroethylene.

The preparation of trichloroacetyl chloride by the photochemical oxidation of tetrachloroethylene has been described heretofore. See, for example, the articles of Dickinson and Leermakers appearing in the Journal of the American Chemical Society, volume 54, page 3852 (1932), and Dickinson and Carrico, ibid, volume 56, page 1473 (1934), and United States patent to Kirkbride, 2,321,823. In one of the prior art methods a gaseous mixture containing tetrachloroethylene, oxygen and chlorine was irradiated with ultraviolet light and trichloroacetyl chloride was formed. In the method described in the patent to Kirkbride, oxygen containing from 1 to 20 per cent of chlorine was bubbled through tetrachloroethylene which was irradiated with ultraviolet light. Trichloroacetyl chloride, tetrachloroethylene oxide and phosgene were the products. The tetrachloroethylene oxide was converted to trichloroacetyl chloride by heat. In these prior oxidation processes the use of actinic light is essential since the desired reaction does not take place in the dark. Consequently, if it is desired to produce trichloroacetyl chloride from tetrachloroethylene by these known methods, it is necessary to provide means for illuminating the reaction mixture. To this end either the reaction vessels or windows therein must be transparent to actinic light, or internal light sources must be provided when opaque reaction vessels are used.

The principal object of the present invention is to provide a method of making trichloroacetyl chloride from tetrachloroethylene which eliminates the necessity of using light to effect the reaction. Another object is to provide a method of converting tetrachloroethylene to trichloroacetyl chloride which is more economical than prior art methods. Another object is to provide a method of the foregoing type which gives good yields of the desired product.

We have discovered a method for producing trichloroacetyl chloride which does not require the irradiation of the reaction mixture and therefore obviates the need for transparent apparatus, light sources and the like. Our invention resides in the discovery that tetrachloroethylene can be readily converted to trichloroacetyl chloride by intimately contacting gaseous oxygen with the liquid tetrachloroethylene in the presence of chlorine and in the presence of a catalytic quantity of an organic peroxide, at an elevated temperature sufficient to decompose the organic peroxide. The method of our invention is most conveniently practiced by bubbling gaseous oxygen and chlorine, preferably in controlled relative proportions, into liquid tetrachloroethylene containing a catalytic quantity of an organic peroxide, the reaction mixture being heated to a temperature sufficient to decompose the peroxide.

The temperature of the reaction mixture is maintained at approximately the decomposition temperature of the organic peroxide and the introduction of the oxygen and chlorine is continued until the desired quantity of tetrachloroethylene has been converted to trichloroacetyl chloride. The trichloroacetyl chloride may be separated from the reaction mixture by fractional distillation if desired. However, in view of the closeness of the boiling points of tetrachloroethylene and trichloroacetyl chloride, it is difficult to effect a separation therebetween by ordinary fractional distillation. Accordingly it may be desirable to convert the trichloroacetyl chloride, without separation as such from the reaction mixture, to a trichloroacetic ester by treating the reaction mixture with the appropriate alcohol. This procedure is very often satisfactory because frequently trichloroacetic alkyl esters are the desired products.

The amount of chlorine employed in practicing the present invention may range from 1 to 20 per cent by volume of the oxygen used. Preferably the amount of chlorine is about 10%, say from 7.5 to 12.5 per cent, by volume of the oxygen. It is not necessary to introduce the chlorine continuously since, if desired, it may be added intermittently. However it is preferred not to allow the amount of chlorine in the reaction mixture at any one time to exceed 20 per cent by volume of the oxygen present, and it is still more highly preferred not to let it exceed 12.5 per cent of the oxygen present. If an excessive amount of chlorine is present, undesired side reactions take place, particularly additive chlorination of the tetrachloroethylene.

If desired, the oxygen may be admixed with an inert diluent gas such at nitrogen; for example, ordinary atmospheric air may be employed. However it is generally preferred to use undiluted oxygen in order to obtain a maximum rate of reaction.

It is highly preferred to admit the gaseous oxygen and the gaseous chlorine or bromine beneath the surface of the liquid reaction mixture through porous diffusion means such as a conventional porous diffusion plate, which is capable of dividing the gas or gases into many fine bubbles, thereby insuring rapid and substantially complete saturation of the liquid tetrachloroethylene with the gases. This precaution is particularly important for the oxygen since otherwise the reaction may quickly deplete the small amount of oxygen soluble in the liquid.

The tetrachloroethylene and the other materials used in practicing the process of the present invention should be free from undesirable impurities which would interfere with the desired reaction. For example the tetrachlorethylene charged should be free from amines; and pure oxygen, chlorine and organic peroxide should be used.

Any organic peroxide which is capable of decomposing at moderately elevated temperatures and liberating units effecting the desired oxidation may be employed. Suitable organic peroxides are diacyl peroxides such as acetyl peroxide, propionyl peroxide, butyryl peroxide, benzoyl peroxide, acetyl benzoyl peroxide, etc., or alkyl peroxides such as tertiary butyl hydroperoxide, etc., or ascaridole, and the like. The amount of organic peroxide employed may be equal to from 0.1 to 5 per cent of the weight of the tetrachloroethylene present. We prefer to employ about 1 per cent by weight of the organic peroxide, say from 0.75 to 1.25 per cent by weight. Benzoyl peroxide is preferred at present since it works very satisfactorily and is commercially available at reasonable cost. The organic peroxide should be soluble in the tetrachloroethylene and in the resulting reaction mixture so that the peroxide is uniformly distributed throughout the reaction mixture in intimate association with the tetrachloroethylene. All of the peroxide may be added to the tetrachloroethylene at the beginning of the reaction or the peroxide may be added in increments during the course of the reaction.

The reaction mixture is heated to a temperature sufficiently elevated to decompose the organic peroxide. This temperature will vary with the peroxide used but in general suitable temperatures will be in the range of from 50° C. to 110° C. When benzoyl peroxide is employed, the preferred temperature is about 70° C., i. e. from 65° to 75° C. The use of too high a temperature should be avoided because at temperatures much above 110° C. undersirable amounts of by-products such as phosgene and hexachloroethane may be formed with a corresponding decrease in the yield of the desired trichloroacetyl chloride. Furthermore the temperature should be below the boiling point of tetrachloroethylene which is 118° C. at atmospheric pressure, unless elevated pressures are used.

The reaction is carried out for a time sufficient to form the desired amount of trichloroacetyl chloride. Twelve hours at 70° C. is sufficient to convert a substantial quantity of tetrachloroethylene to trichloroacetyl chloride, although longer reaction times up to 100 hours may be employed when higher yields are desired.

The process of the present invention may be carried out either in a batchwise manner or continuously. Continuous operation is often preferred in large scale production. In continuous operation a body of liquid reaction mixture may be maintained continuously in a suitable reaction zone and fresh tetrachloroethlene containing a suitable amount of dissolved organic peroxide may be introduced continuously thereto while a stream of the reaction mixture is continuously withdrawn and passed to suitable recovery steps or to further reaction steps such as a step wherein the trichloroacetyl chloride is reacted with an alcohol to give the trichloroacetic ester which may then be recovered in any suitable manner.

While we are not limited by any theory as to the mechanism whereby the present invention operates, we believe that the tetrachloroethylene is converted to trichloroacetyl chloride by the action of free radicals which are generated thermally by the decomposition of the organic peroxide.

*Example*

One hundred and twenty-two grams of tetrachloroethylene are placed in a suitable reaction vessel provided with inlet tubes for introducing gas beneath the surface of the liquid, and 1.2 grams of benzoyl peroxide are dissolved in the tetrachloroethylene. A source of oxygen is connected to one inlet tube and a source of gaseous chlorine to the other. The reaction mixture is heated to 70° C. and oxygen and chlorine are bubbled through at the rates of 123 cc. per minute and 14 cc. per minute respectively. The temperature of the reaction mixture is maintained at 70° C. while the bubbling in of the oxygen and chlorine is continued for 12 hours. At the end of that time 50 cc. of absolute ethyl alcohol is added to the reaction mixture to convert the trichloroacetyl chloride to the ethyl ester. Because of the exothermicity of the reaction between alcohol and trichloroacetyl chloride the alcohol must be added slowly to avoid violent over-heating. The mixture containing the trichloroacetyl ethyl ester is washed with water to remove hydrogen chloride and unreacted alcohol. The ethyl trichloroacetate is separated from the higher and lower boiling products in the nonaqueous layer by distillation at reduced pressure. A total of 18 cc. of ethyl trichloroacetate is thus obtained. If either the chlorine or the organic peroxide be eliminated from the above example, no production of trichloroacetyl chloride is observed. If the original reaction conditions are maintained for a considerably longer time, say 75 to 100 hours, the yield of trichloroacetyl chloride is correspondingly higher.

From the foregoing description the following advantages of our invention will be apparent to those skilled in the art. The invention provides a method of thermally oxidizing tetrachloroethylene to trichloroacetyl chloride which is considerably cheaper than photochemical oxidation since it eliminates the need for light sources and for transparent equipment. The yields of the desired trichloroacetyl chloride are excellent, being comparable with the yields which are obtained when using the photochemical methods of the prior art. The method is simple and economical to carry out. The reaction of the present invention proceeds equally well in the dark and in the light. The method is free from undesirable side reactions and is easily kept under control.

Having thus described our invention, what we claim and desire to protect by Letters Patent is:

1. The process of making trichloroacetyl chloride from tetrachloroethylene which comprises intimately contacting gaseous oxygen with liquid tetrachloroethylene in the presence of chlorine and in the presence of a quantity of an organic peroxide equal to from 0.1 to 5 per cent of the weight of tetrachloroethylene, said peroxide being selected from the group consisting of acyl peroxides, alkyl peroxides and ascaridole, at an elevated temperature of from 50° C. to 110° C. at which said peroxide decomposes.

2. The process of claim 1 wherein the volume of chlorine ranges from 1 to 20 per cent of the volume of said oxygen.

3. The process of making trichloroacetyl chloride from tetrachloroethylene which comprises bubbling gaseous oxygen and chlorine into liquid tetrachloroethylene in the presence of a quantity of an organic peroxide equal to from 0.1 to 5 per cent of the weight of tetrachloroethylene, said peroxide being selected from the group consisting of acyl peroxides, alkyl peroxides and ascaridole, at an elevated temperature of from 50° C. to 110° C. at which said peroxide decomposes.

4. The process of making trichloroacetyl chloride from tetrachloroethylene which comprises bubbling gaseous oxygen and chlorine through liquid tetrachloroethylene having from 0.1 to 5 per cent by weight of benzoyl peroxide dissolved therein, and maintaining the reaction mixture at a temperature of from 50° C. to 110° C. at which said benzoyl peroxide decomposes, the amount of said chlorine ranging from 1 to 20% by volume of said oxygen.

5. The process of making trichloroacetyl chloride from tetrachloroethylene which comprises bubbling gaseous oxygen and chlorine through liquid tetrachloroethylene having from 0.75 to 1.25 per cent by weight of benzoyl peroxide dissolved therein while maintaining the reaction mixture at a temperature of approximately 70° C., the amount of said chlorine ranging from 7.5 to 12.5 per cent by volume of said oxygen.

EDWIN J. HART.
MAX S. MATHESON.

REFERENCES CITED

The following references are of record in the file of this patent:

FOREIGN PATENTS

| Number | Country | Date |
| --- | --- | --- |
| 340,872 | Germany | Sept. 19, 1921 |